United States Patent [19]

Greenhut

[11] 4,044,362
[45] Aug. 23, 1977

[54] DATA RECORDING INSTRUMENT

[76] Inventor: Bart E. Greenhut, c/o Impact-O-Graph Corporation, 4943 McConnell Ave., Suite K, Los Angeles, Calif. 90066

[21] Appl. No.: 663,701

[22] Filed: Mar. 4, 1976

[51] Int. Cl.² .................. G01D 15/24; G01D 9/00
[52] U.S. Cl. ............................. 346/136; 346/145; 346/33 TP; 73/343.5
[58] Field of Search ............. 346/33 TP, 136, 145; 73/343.5

[56] References Cited

U.S. PATENT DOCUMENTS

| 2,776,569 | 1/1957 | Biro | 346/145 UX |
|---|---|---|---|
| 2,903,323 | 9/1959 | Riester, Jr. et al. | 346/136 |
| 3,119,269 | 1/1964 | Hiscock | 346/33 TP |
| 3,129,998 | 4/1964 | Lackoff | 346/145 X |
| 3,183,717 | 5/1965 | Brainard | 73/343.5 |
| 3,281,090 | 10/1966 | Baranowski, Jr. | 346/136 X |
| 3,294,212 | 12/1966 | Gearheart et al. | 346/145 UX |
| 3,787,885 | 1/1974 | Johnson | 346/33 TP UX |
| 3,805,270 | 4/1974 | Grant et al. | 346/145 X |
| 3,910,119 | 10/1975 | Maxwell | 346/33 TP X |
| 3,971,035 | 7/1976 | Maxwell | 346/33 TP |

Primary Examiner—George H. Miller, Jr.

[57] ABSTRACT

A recording instrument for accompanying a cargo to record an environmental variable such as temperature, the housing of the instrument containing a removable chart pack with two spools and the chart pack being retained in the housing by two lugs located on a motor case in the housing lid. The battery circuit that drives the electric motor for the spools is activated by pulling an exposed non-conductive strip out from between two terminals.

2 Claims, 9 Drawing Figures

DATA RECORDING INSTRUMENT

BACKGROUND OF THE INVENTION

The present invention relates to a data recording instrument and more particularly to a data recording instrument for recording an environmental variable.

When goods of any kind are handled and moved in shipment, the possibility exists that they may be damaged as a result of change in an environmental variable such as temperature, impact or humidity from the beginning of the trip to its destination. Certain goods are damaged when the temperature of the environment in which they are transported changes beyond certain limits. Other types of cargo are particularly sensitive or fragile and as a consequence of mishandling, abuse, accident, excess impact, drifting of the cargo or the like, damage may occur. Of course the sensitivity or fragility of the particular goods involved determines the extent to which they can withstand or remain unaffected by various magnitudes of impact shock forces.

The damage created by excessive changes in a particular environmental variable are frequently not visible or immediately ascertainable by the receiver, particularly when the goods are delivered packaged and neither the shipper or the freight forwarder is aware of the occurence of any improper variance in a particular environmental variable. When the injury or damage to the goods is finally discovered by the purchaser controversies may arise as to whether the shipper, the freight forwarder, or the customer is responsible for the damage.

In order to remove or minimize the uncertainty as to who shall be the responsible or liable party in the above described circumstances, shippers have increasingly adapted the utilization of some form of indicating, monitoring or recording device which will provide evidence of the occurence of a change in an environmental variable which will possibly damage the goods. Data recording instruments for recording an environmental variable on a strip chart are presently being used by shippers from the time that it leaves the shipper until it is received by the purchaser.

The prior art strip chart data recording instruments have utilized a manually wound or battery powered strip chart motor for moving the strip chart past a sensor at a predetermined rate of speed. The sensor marks the environmental variable on the strip chart as it passes thereunder. Thus, a record is made of the environmental variable on the strip chart and if there is any change in the environment that would damage the goods shipped, it is recorded on the strip chart and the time of the occurence would also be indicated. Accordingly, the responsibility for damage to the goods is readily ascertainable upon inspection of the strip chart.

One such prior art strip chart data recording instrument is disclosed in Johnson, U.S. Pat. No. 3,787,885. Johnson discloses a strip chart recorder which has a disposable strip chart dispenser. The dispenser holds one rolled end of the strip chart and the free end passes over a writing surface and beneath a window exposing the strip chart above the writing surface. The free end of the strip chart coming out of the dispenser is secured to a drive spool which is powered by a battery driven motor. When the battery driven motor is activated, the drive spool is rotated to thereby rotate the drive spool and correspondingly advance the strip chart at a predetermined rate of speed. The drive spool is mounted independent of the dispenser and the strip chart may readily be removed from the drive spool after use of the strip chart data recording instrument.

As pointed out above the primary reason for using a data recording instrument is to determine whether or not goods are damaged in shipment due to the change in an environmental variable and if so determine who shall be the responsible or liable party for that damage. It is important therefore, that after the data recording instrument is used, the strip chart may not be tampered with or altered or changed. On the other hand the data recording instrument must allow the strip chart to be removed from the data recording instrument after use so that the data recording instrument may be used again. In addition, the strip chart should be available for inspection after the goods are shipped to determine whether any damage occured to the goods in shipment as a result of a change in an environmental variable.

It is also desirable to provide a sensor in the data recording instrument that is adjustable so that depending on the level of the environmental variable to be sensed, the sensor may be adjusted accordingly. For example, it is desirable to ship certain goods in a certain range of tempertures. Accordingly, it is desirable to adjust the marker of the temperature sensor so that it will move between the predetermined range of temperatures and will accordingly record any change in the environmental temperture.

SUMMARY OF THE INVENTION

The present invention provides a data recording instrument for recording an environmental variable on a strip chart. The data recording insturment includes a chart pack assembly having a chart case and a strip chart and a pair of strip chart reels. The strip chart reels are rotatably mounted in the chart case for moving the strip chart therebetween upon rotation thereof. The chart case has a plurality of chart case members which prior to assembly allow the strip chart reels to be positioned therein with one end of the strip chart would around one of the strip chart reels. The central portion of the strip chart extends between the strip chart reels with a portion thereof positioned adjacent to the window and the opposing strip chart supporting surface. The other end of the strip chart is secured to the other strip chart reel. In order to insure security of the strip chart so that the strip chart may not be tampered with, altered or changed, the chart case members are permanently secured to each other after assembly of the chart case assembly. Thus, the strip chart may not be tampered with or altered or changed unless permanent damage is done to the chart pack assembly.

The data recording instrument of the present invention also provides a base having portions which co-act to support and position the chart pack assembly with respect to a drive means so that the movement of the strip chart is assured by driving engagement with a drive motor. The data recording instrument of the present invention also provides a sensor for sensing an environmental variable and having a marking device for marking and recording the environmental variable on the strip chart. When temperature is the environmental variable to be sensed, the data recording instrument of the present invention provides an adjustable sensor which allows adjustment of the range of the temperatures to be sensed.

Accordingly, it is an object of the present invention to provide a data recording instrument for recording an environmental variable on a strip chart which prohibits tampering, altering or replacement of the strip chart.

It is another object of the present invention to provide a data recording instrument for recording an environmental variable on a strip chart which allows for ready inspection of the strip chart and advancing the strip chart in either direction while assuring that the strip chart may not be tampered with, altered or replaced.

It is still another object of the present invention to provide a data recording instrument for recording an environmental variable on a strip chart which allows the strip chart to be readily removed after use thereof and replaced with a new strip chart without imparing the security of the used strip chart.

It is still a further object of the present invention to provide a data recording instrument for recording an environmental variable on a strip chart secured in a chart pack assembly which chart pack assembly is extremely compact, inexpensive and readily transportable through the mail.

It is still a further object of the present invention to provide a data recording instrument having a sensor which has an adjustable marker to record a variety of ranges of temperature on the strip chart.

Other objects and advantages of the invention will appear during the course of the following description and with reference to the annexed drawings in which like parts are designated by like numerals throughout the same.

DETAILED DESCRIPTION OF THE INVENTION

Figure 1:
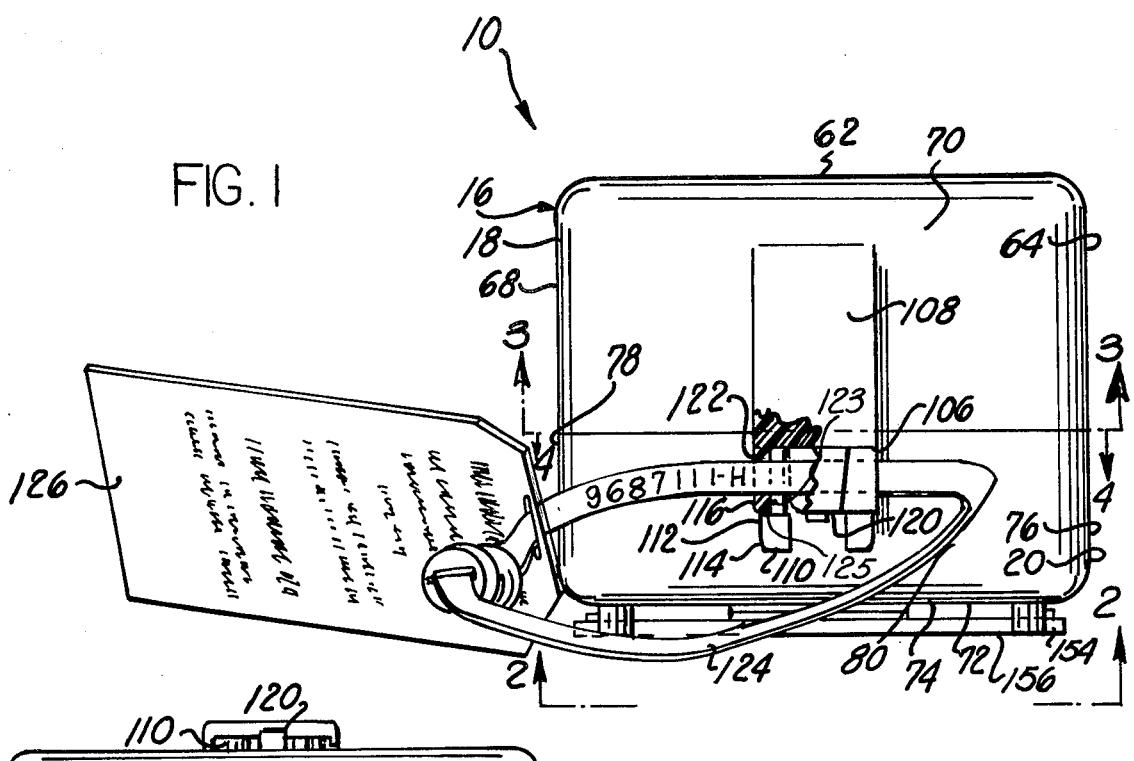
FIG. 1 is a plan view of a data recording instrument of the present invention with a mounting plate positioned on the bottom thereof.
Figures 3, 4:
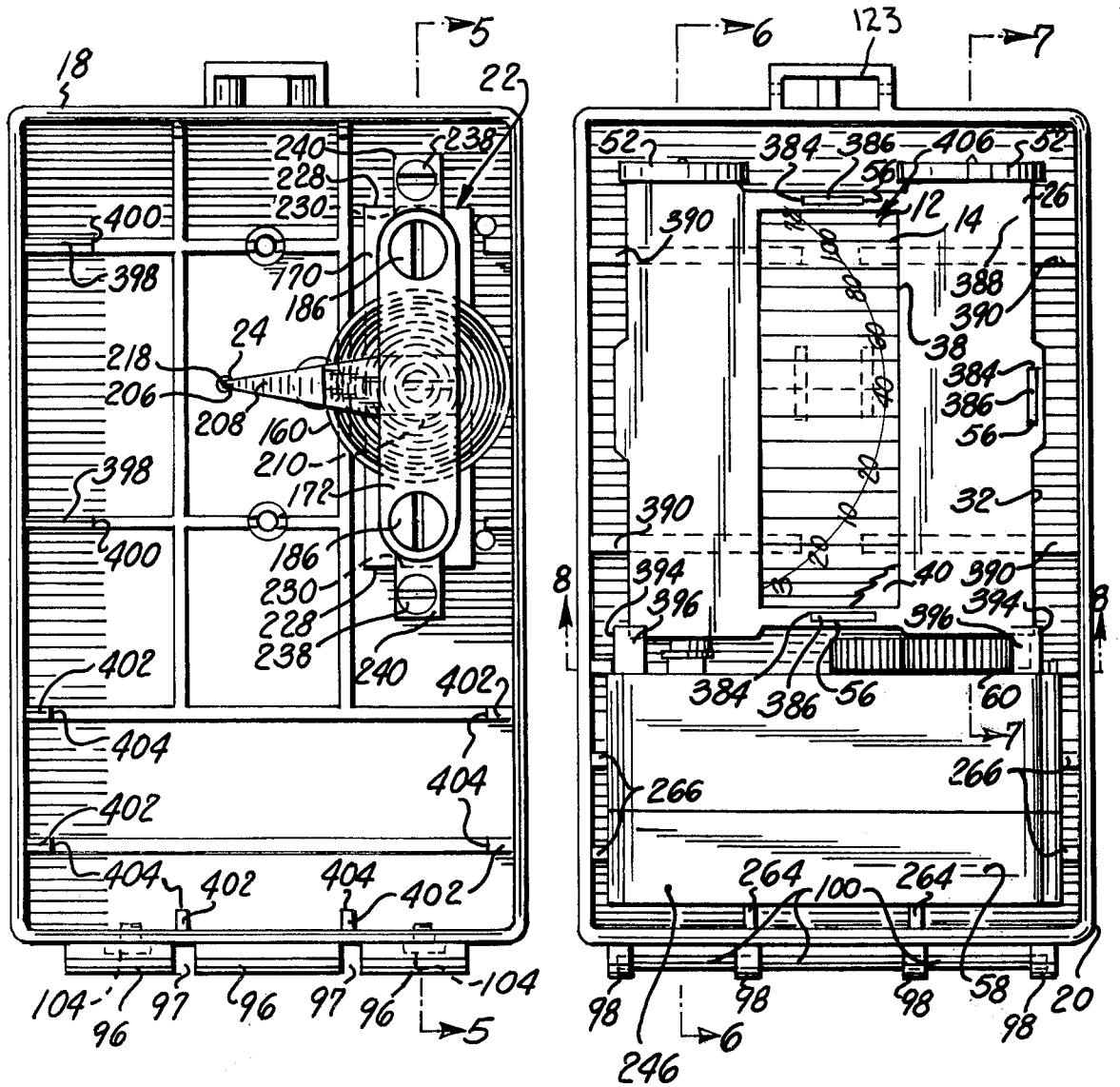
FIG. 3 is a sectional view of the data recording instrument shown in FIG. 1 and taken along line 3—3 thereof.
FIG. 4 is a cross sectional view of the data recording instrument shown in FIG. 1 and taken along line 4—4 thereof.

The present invention provides a new and improved data recording instrument 10, as seen in FIG. 1, for recording an environmental variable on the recording surface 12 of a strip chart 14, as seen in FIG. 4. The data recording instrument 10, includes a housing or base 16, having an upper base member 18 and a lower base member 20. Means for sensing the environmental variable of temperature is secured to the upper base member 18 and is generally indicated by the numeral 22 in FIG. 3. The sensor 22 has a marking means, generally indicated at 24, for recording the temperature on the recording surface 12 of the strip chart 14. The marking means 24 is adjustable so as to allow a number of different ranges of temperatures to be recorded on the strip chart 14 as will hereinafter be described.

The data recording instrument 10 of the present invention also includes a chart pack assembly 26, as seen in FIG. 4, for retaining the strip chart 12. The chart pack assembly 26 includes the strip chart 14, a feeding strip chart reel 28 and a driven strip chart reel 30.

Figure 6:
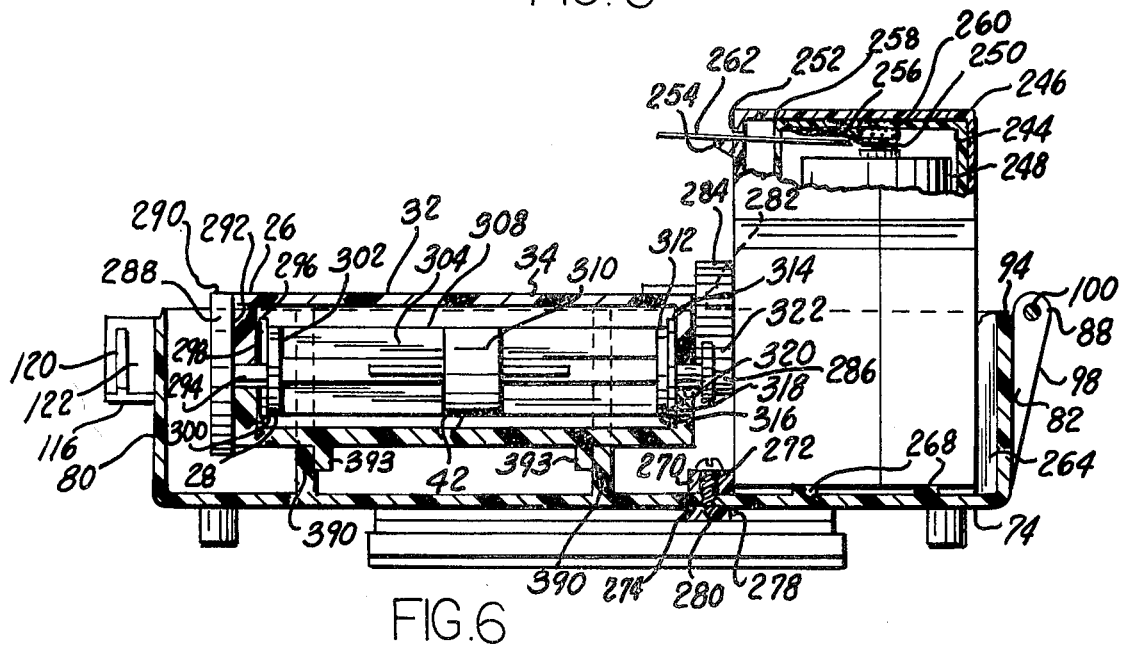
FIG. 6 is a cross sectional view of the data recording instrument shown in FIG. 4 and taken along line 6—6 thereof.
Figure 7:
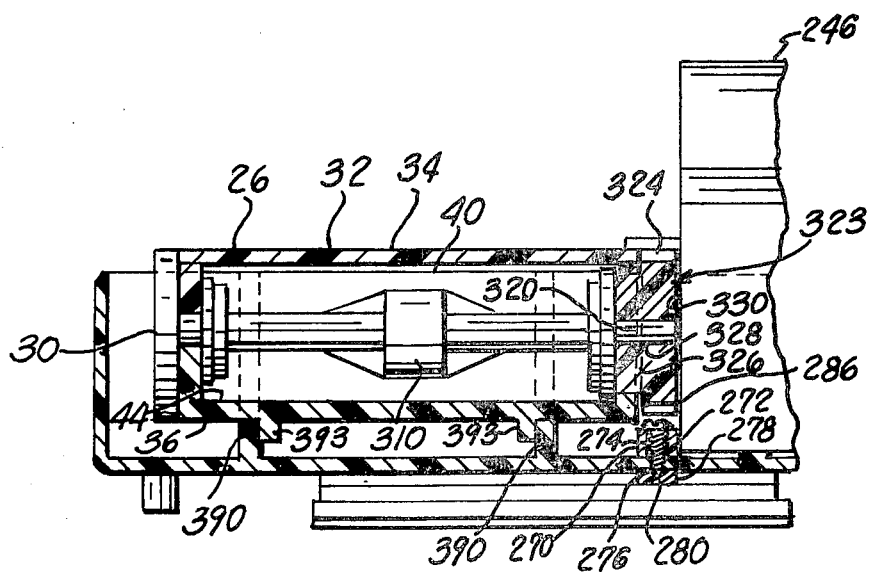
FIG. 7 is a partial sectional view of the data recording instrument shown in FIG. 4 and taken along line 7—7 thereof.

The chart pack assembly 26 also includes a chart case 32 having an upper chart case member 34 and a lower chart case member 36, as seen in FIGS. 6 and 7. The upper chart case member 34 has a window 38 therein and the lower chart case member 36 has a strip chart supporting surface 40, as seen in FIG. 4. The window allows the strip chart 14 to be viewed by an observer and also allows the marker 24 of the sensor 22 to mark the environmental variable on the recording surface 12 of the strip chart 14. After use of the data recording instrument 10, the strip chart 14 may be viewed through the window 38 by an observer by advancing the strip chart in either direction past the window. The strip chart supporting surface 40 of the lower chart case member 36 is provided to support the strip chart 14 when pressure is exerted thereon by the marker 24 or an operator of the data recording instrument 10 when it is desirable to write particular notations, such as starting and stopping notations, on the strip chart.

Figure 8:
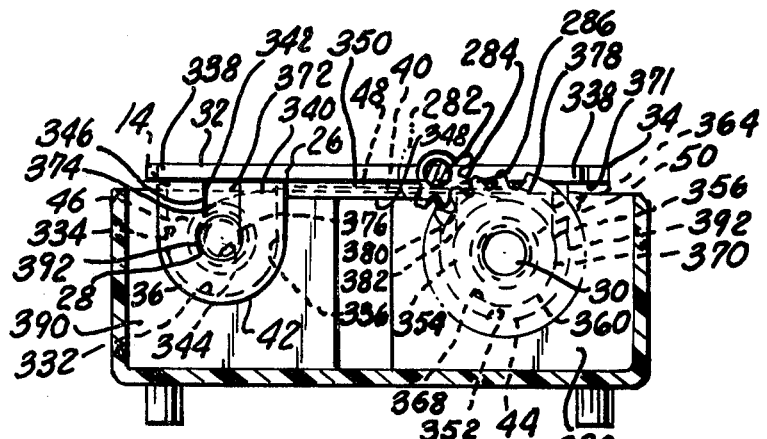
FIG. 8 is a cross sectional view of the portion of the data recording instrument shown in FIG. 4 and taken along line 8—8 thereof.

The chart case 32 has a feeding reel cavity 42 and a driven reel cavity 44 in the lower chart case member 36, as seen in FIGS. 6 and 7, for rotatably supporting and retaining the feeder strip chart reel 28 and driven strip chart reel 30 respectively therein. One end portion 46 of the strip chart 14 is wound around the feeding strip chart reel 28. The central portion 48, as seen in FIG. 8, of the strip chart 14 extends from reel 28 to reel 30 and has a portion thereof adjacent to and between the window 38 and the strip chart supporting surface 40. The other end of portion 50 of the strip chart 14 is secured to the driven strip reel 30. It should be understood that the means for securing the strip chart 14 to the reels 28, 30 may be by any conventional means such as a strip of tape secured to the ends of the strip chart 14 and the respective reels 28 and 30. As seen in FIG. 4, means 52 are provided on the reels 28 and 30 for manually advancing the strip chart 14 past the window 38 and between the reels 28, 30 in either direction as will be hereinafter more fully described.

Means are also provided for permanently securing the case members 34 and 36 together and are generally indicated at 56 in FIG. 4. The securing means 56 serves to prohibit tampering, alteration, or replacement of the strip chart 14 after assembly of the chart pack assembly 26. The chart pack assembly 26 provides a high degree of security of the strip chart 14 while allowing inspection of the strip chart after use thereof. The chart pack assembly 26 also allows the strip chart 14 to be readily removed after use thereof without imparing the security of the used strip chart.

The data recording instrument 10 also includes a drive means 58 drivingly connected by a transmission means 60, as seen in FIG. 4 to the driven strip chart reel 30. When the drive means 58 is activated, the driven strip chart reel 30 is rotated and consequently the strip chart 14 is advanced from the feeding reel 28 towards the driven reel 30 at a predetermined speed. Thus, during use of the data recording instrument 10, the time any change occurs in the environmental variable may be readily determined. The base 18 of the data recording instrument 10 of the present invention is provided to hold the components of the data recording instrument in position with respect to each other in a manner that will allow easy accessibility thereto. In addition, the base 18 prohibits unauthorized tampering with the data recording instrument 10. The upper and lower base members 18 and 20 described hereinafter are molded from a plastic material and have a number of various projections, recesses, indentations and apertures therein as is further described. It should be understood that the base members 18, 20 may be made of any conventional construction of materials which serve the same purpose and functions as herein set forth.

Figure 5:
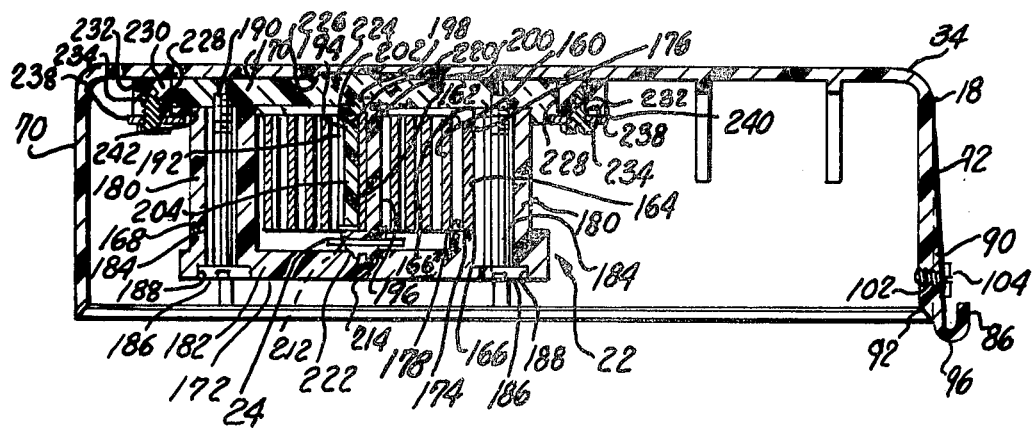
FIG. 5 is a cross sectional view of the data recording instrument shown in FIG. 3 and taken along line 5—5 thereof.

The upper base member 18 includes a top portion 62, longitudinal side portions 64, 68 and a front side portion 70 as seen in FIG. 1. The upper base member 18 also includes a rear side portion 72, as shown in FIG. 5. The lower base member 20 has a bottom portion 74 and longitudinal side portions 76, 78 and a front side 80 as seen in FIG. 1. The lower base member 20 also has a rear side portion 82, as shown in FIG. 6.

Figure 2:
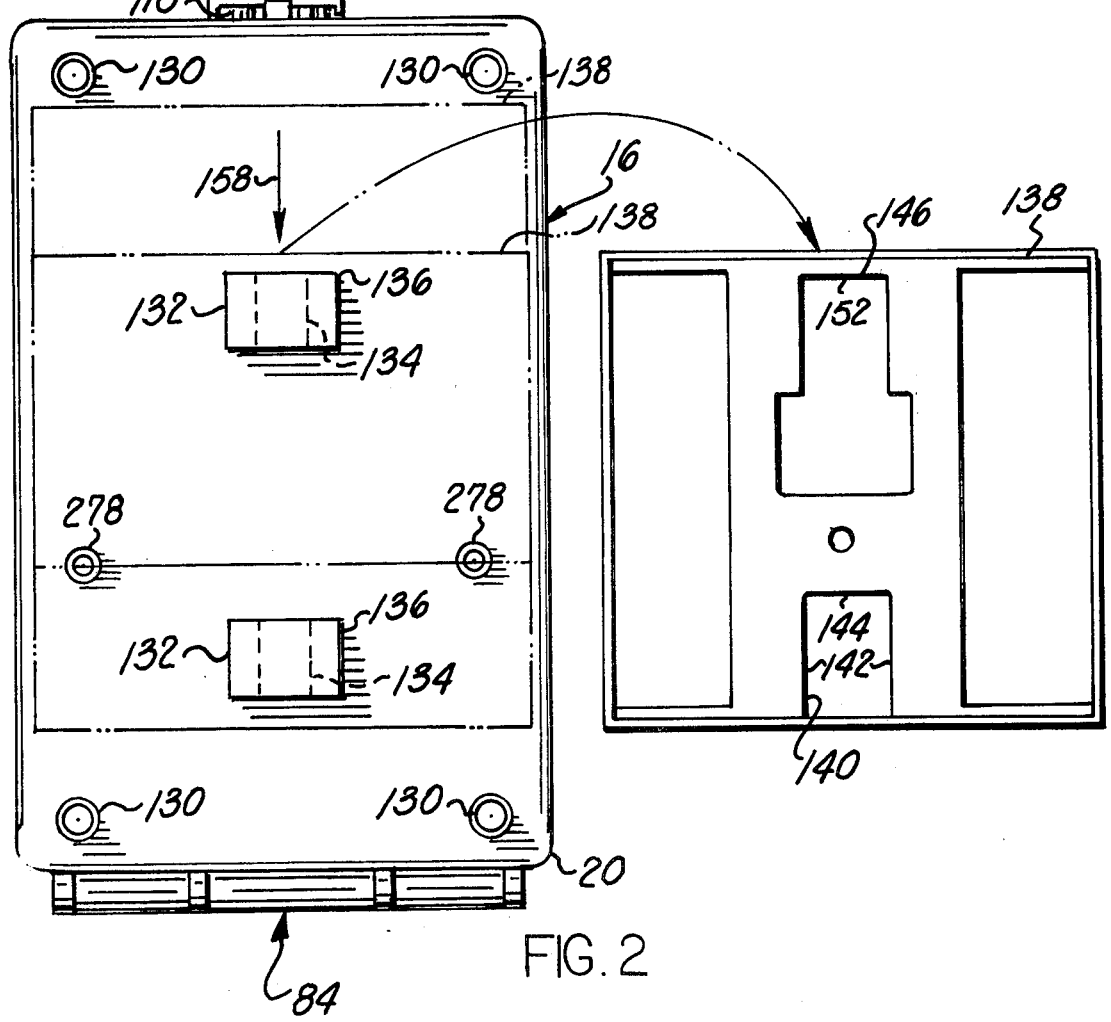
FIG. 2 is a side elevational view of the data recording instrument shown in FIG. 1 and taken along line 2—2 thereof with the mounting plate removed therefrom and shown in FIG. 2.

Interconnecting means, shown at 84 in FIG. 2, is provided to interconnect the upper and lower base members 18, 20. The interconnecting means 84 includes a hinge portion 86 on the upper base member 18 as seen in FIG. 5 and a hinge portion 88 on the lower base member 20 as seen in FIG. 6. The interconnecting means 84 allows the upper and lower base members 18 and 20 to be moved between an open and closed position. In the closed position, the upper mating lip 92, extending about the periphery of the side portions 64, 68, 70 and 72, mates with the lower mating lip 94 of the lower base member 20 as seen in FIG. 6. The lower mating lip 94 is defined by the upper edge of the side portions 76, 78, 80, and 82.

The hinge portions 86 on the upper base member 18 include a reinforcing portion 90 on the rear side 72. The reinforcing portion extends downwardly to the upper mating lip 92 and terminates in a hook-shaped portion 96. The hook-shaped portions 96 extend along three portions of the rear side 72 with spaces 97 therebetween as seen in FIG. 3.

The hinge portions 88 on the lower base member 20 includes reinforcing portions 98 as seen in FIGS. 4 and 6. The reinforcing portions 98 are spaced so that they coincide with the spaces 97 between the hook-shaped portions 96. Shaft portons 100 extend between the reinforcing portions 98. The shaft portions are positioned so that the hook-shaped portions 96 can hook over the shaft portions 100 and thereby provide a hinged connection between the base members 18, 20.

To assure that the hook-shaped portions 96 will not become disengaged with the shaft portions 100, the upper base member 18 has a series of apertures 102 therein for threadedly engaging threaded fasteners 104 therein, as seen in FIG. 5. The heads of the threaded fasteners 104 prohibit movement of the shaft portions 100 out of engagement with the hook-shaped portions 96 and thereby assures a hinge connection between the base members 18, 20.

The base 16 also provides closure means 106 for assuring the security of the data recording instrument 10 of the present invention and prohibiting tampering with the data recording instrument during operation thereof. The closure means 106 as seen in FIG. 1, includes an upper reinforcing portion 108 on the front side 70 of the upper base member 18. Extending from the reinforcing portions 108 are a pair of flexible tines 110 terminating in enlarged end portions 112 having surfaces 114 on the extremities thereof.

The lower base member 20 has extending portions 116 extending from the front side 80 with a cover portion 120 extending therebetween. The cover portion 120 and the extending portions 116 form an opening 122 through which the sealing band 124 may be placed and a tine receiving opening 123.

When the base members 16, 18 are pivotaly moved toward each other, the enlarged end portions 112 of the flexible tines 110 contact the extending portions 116, enter the tine receiving opening 123 and move inwardly until the enlarged end portions 112 are past the extending portions 116. The tape red surfaces 114 are provided to smoothly move the tines 110 inwardly. When the enlarged portions 112 are past the extending portions 116, the tines 110 move outwardly and the enlarged portions are in locking contact with the locking surface 125 of the portions 116 and 120. This movement of the tines 110 locks the upper and lower base members 16 and 18 together.

To secure the closure 106 so that data recording instrument 10 may not be tampered with or altered, the sealing band 124, as seen in FIG. 1, is positioned through the opening 122 so that the tines 110 may not move out of engagement with the extending portions 116. A tag 126 may be attached to the sealing band 124 to make appropriate notations and instructions thereon.

The base 16 also includes means 128 for mounting the data recording instrument 10 to the goods to be shipped or the container or vehicle in which the goods are shipped so that the environmental variable to be sensed by the data recording instrument 10 is properly recorded.

The mounting means 128 includes legs 130, as seen in FIG. 2, for supporting the base 16 on the surface to which it is to be mounted. The mounting means 128 also includes T-shaped retainers 132 extending from the bottom 74 of the lower base member 20. The T-shaped retainers 132 have a portion 134 extending from the bottom 74 and terminating in a top portion 136 which is greater in width than width of the base portion 134.

The mounting means 128 also includes a mounting plate 138 having a slot 140 for receiving one of the T-shaped retainers 132 therein. The slot 140 has side surfaces 142 terminating in a rear surface 144. The mounting plate 138 has a T-shaped aperture 146 for receiving the other T-shaped retainer 132. The T-shaped aperture 146 has an enlarged opening 148 which is sufficiently large for the top portion 136 of the T-shaped retainer 132 to be moved therethrough. Extending from the enlarged openings 148 are side surfaces 150 terminating in a rear surface 152. The side surfaces 142 and 150 are positioned so as to slidably receive the base portions 134 of the T-shaped retainers 132.

In order to mount the data recording instrument 10 to the surface to which it is to be mounted, a double sides adhesive foam member 154, as seen in FIG. 1, is secured to the mounting plate 138. The member 154 has an adhesive surface 156 on one side thereof for securing the plate 138 to the surface to which the data recording instrument is to be mounted.

In order to utilize the mounting means 128 to secure the data recording instrument 10 to the surface to whichit is to be mounted, the mounting plate is assembled onto the lower base member 20 as seen in FIG. 2. The enlarged opening 148 of the T-shaped aperture 146 in the mounting plate 138 is aligned with one of the T-shaped retainers 132. When the enlarged opening 148 receives one of the T-shaped retainers 132, the slot 140 is positioned adjacent to the other T-shaped retainer 132. Since the side surfaces 142 of the slot 140 and the side surfaces 150 of the T-shaped aperture 146 are complimentary with the base portions 134 on the base member 20 the mounting plate 138 may be moved forward in a direction indicated by the arrow 158. The mounting plate 138 is thereby secured to the lower base member 20.

It is readily seen that the top portion 136 of the T-shaped retainers 132 co-act with the portions of the mounting plate 138 adjacent the side surfaces 142 and 150 so that movement of the plate toward and away from the lower base member 20 is prohibited. The movement of the mounting plate 138 is the direction 158 is continued until the rear surfaces 144 and 152 come into contact with the base portions 134 extending from the bottom 74 of the lower base member 20.

With mounting plate 138 secured to the lowerbase member 20 the adhesive surface 156 of the double sided adhesive foam member 154 may then be placed into contact with the surface on which the data recording instrument 10 is to be mounted and is thereby secured thereto. When it is desirable to remove the data recording instrument 10 from the lower base member 20, the data recording instrument 10 is moved in a longitudinal direction opposite to the direction indicated by the arrow 158. Such movement allows the mounting plate 158 to remain on the surface to which the instrument 10 is attached while allowing the instrument to be detached from the mounting plate 138.

The sensor 22, shown in connection with the data recording instrument 10 in FIG. 1 through 8, senses the environmental variable of temperature. It should be understood though that other sensors such as the impact sensor shown in FIG. 9 may be used in connection with the data recording instrument 10 of the present invention.

In order to sense the environmental temperature, sensor 22 has a coiled bi-metalic member 160 as shown in FIG. 3 and 5. The bi-metalic member 160 expands and contracts when the temperature of its environment changes in a manner well known to those skilled in the art. The bi-metalic member 160 has an inner end portion 162 and an outer end portion 164 which has beveled edges 166.

A mounting frame 168 is provided to retain the components of the sensor 22 together to operate as will be hereinafter described. The mounting frame 168 includes a base frame member 170 and a U-shaped frame member 172. The U-shaped member 172 has two leg portions 180 inteconnected by an interconnecting portion 182. The frame member 172 has apertures 184 which extend through the interconnecting portions 182 and leg portions 180 to accommodate a threaded fastener 186 therein. The apertures 184 are counter sunk at locations 188 to accommodate the heads of the threaded fasteners 186 therein. A flush surface is thereby provided on the outer surface of the interconnecting portions 182 of the U-shaped frame member 172.

Means, generally indicated at 174, are provided for moving the gripping portion 176 on the base frame member 170 toward the gripping portion 178 of the U-shaped frame member 172 and include the threaded fasteners 186. The base frame member 170 has threaded openings 190 into which the threaded fasteners 186 are threadedly received.

In order to secure the outer end portion 164 of the bi-metalic member 160 to the mounting frame 168, the bevel edges 166 of the outer end portion 164 are positioned adjacent to the gripping portions 176 and 178. The threaded fasteners 186 are threadedly engaged in the threaded openings 190 in the base frame member 170 and are tightened to move the gripping portions 176 and 178 toward each other. The frame members 170 and 172 are made of any well known plastic material so that when the members 170 and 172 are moved toward each other by the threaded fasteners 186 the bevel edges 166 bite into the gripping portions 176 and 178 and are thereby secured to the frame member 170, 172. Other fastening means can be used in lieu of fastener 186.

To secure the inner end portion 162 of the coiled bi-metalic member 160 to the marking means 24, a pivot pin 192 is provided. The pivot pin 192 includes pivot members 194 and 196 which are identical in construction and for ease of description one of which will be hereinafter described.

The pivot pin member 194 has an end pin portion 198 adjacent to a flange portion 200 and extending therefrom as seen in FIG. 5. The flange portion 200 has a depression 202 which is generally rectangular in configuration. The pivot pin member 194 also has a pin leg 204 adjacent to the depression 202 and extending from the flange portion 200 in an opposite direction from the end pin portion 198. The pin leg portion 214 has a generally rectangular cross sectional configuration.

To assemble the pivot pin member 194, 196, the pin leg portion 204 of one of the pivot pin members 194 is positioned adjacent to one side of the inner end portion 162 of the bi-metalic member. The pin leg 204 of the other pivot pin member 196 is positioned on the other side of the inner end portion 162. The pivot pin member 194, 196 are then moved toward each other so that the ends of their respective pin legs 204 are received by the respective openings 202 in each other. The openings 202 are of such a size so that the pin leg 204 which fits therein is frictionally secured thereto.

It can be seen from the above connection of the pivot pin 192 to the inner end portion 162 of the coiled bi-metalic member 160 that when there is a change in the environmental temperature, the bi-metalic member 160 will move in a manner known to those skilled in the art and thereby rotate the pivot pin 192.

The sensor 22 includes the marking means 24 to record the environmental temperature on the strip chart 14. The marking means 24 is secured to the end pin portion 198 of the pivot pin member 196 as seen in FIG. 5.

The marking means 24 includes a stylus 206 including a leaf spring 208 having a pivot end 210 and a moving end 216. The pivot end 210 has a aperture 212 therein to frictionally engage the end pin portion 198 of the pivot pin member 196. A spring fastener 214 is provided to urge the leaf spring 208 towards the flange 200 of the pivot pin member 196 and thereby assure rotation of the leaf spring 208 upon rotation of the pivot pin 192. It should be understood though that the fasteners 214 allows the leaf spring 208 to be manually rotated and thereby allows adjustment of the leaf spring when it is desirable to change the range of temperatures sensed by the sensor 22.

As seen in FIG. 3, the marking end 216 of the leaf spring 208 has a marking point 218. The strip chart 14 has a recording surface 12 which is pressure sensitive, that is when pressure is exerted by a point on the recording surface 12 a mark is made. The marking point 218 will leave a mark on the strip chart 14 as the strip chart is moved past the marking point to thereby record the environmental temperature and any changes therein.

Once the marking means 24 is assembled with the pivot pin 192 as described above, the end pin portions 198 of the pivot pin 192 are located in the depression 220 and 222 in the frame members 170 and 172 respectively to thereby assure pivotal movement of the pivot pin 192.

To properly locate the sensor 22 on the upper base member 18, a depression 224, as seen in FIG. 5, is located on the inner surface of the top portion of the upper base member 18. The depression 224 is positioned so that the boss 226 on the base frame member 170 may be received therein. The upper base member 18 has inwardly extending lugs 232 on the inside of the top portion thereof. The lugs 232 have locating surfaces 230 thereon.

The locating surfaces 230 are complementary with locating surfaces 228 on the base frame member 170. When the boss 226 is located in the depression 224 and the locating surfaces 228 and 230 are in contact with each other, the sensor 22 is located so that the marking point 218 is properly positioned with respect to the recording surface 12 of the strip chart 14. When the upper and lower base members 18 and 20 are in their closed position as described above the sensor 22 will make a mark on the recording chart 14 to record the environmental temperature thereon.

To secure the sensor 22 in such a position on the upper base member 18, threaded fasteners 238 are provided with washers 240 thereon. The washers 240 have lip portions 242. When the threaded fasteners 238 are received in apertures 234 in the inwardly extending lugs 232 and tightened, the lip portions 242 of the washers 240 engage the base frame member 70 to thereby secure the sensor 22 to the upper base member 18.

The drive means, generally indicated at 58 in FIGS. 4 and 6, is provided and includes a timer motor 244 mounted in a casing 246 and is powered by a battery 248. The battery 248 is electrically connected to the timer motor 244 in any conventional manner. An electrical contactor 256 is in contact with one of the terminals of the battery 248. The contactor 256 is secured to the inner casing 258 and is biased toward the one terminal of the battery 248 in any conventional manner such as by a resilient piece 260.

The timer motor 244 may be selectively connected or disconnected to the battery 248 so that consequently the strip chart 14 is either driven or not driven. A switch 250 is provided and includes an opening 252 in the casing 246 with a lead in ledge 254 adjacent thereto. A non-conductive strip 262, such as a strip of plastic, may be laid on the lead in ledge 254 and moved toward the battery 248 through the opening 252. To disconnect the battery 248 from the timer motor 244, the non-conductive strip 262 is moved toward contactor 256 until it is positioned between the contactor 256 and the one terminal of the battery 248.

It is important that all of the components of the data recording instrument 10 be properly and securely positioned since the data recording instrument may have impact forces exerted thereon. In order to secure the drive means 58 to the lower base member 20, rear positioning ribs 264, side positioning ribs 266 and bottom positioning ribs 268 are provided as seen in FIGS. 4 and 6. When the drive means 58 is properly positioned, the casing 246 has one side adjacent to and in contact with the rear positioning ribs 264 and the bottom of the casing 246 is adjacent to and in contact with the bottom positioning ribs 268. The sides of the casing 246 are likewise in contact with and adjacent to the side positioning ribs 266 so that movement of the drive means 58 in the lateral direction or one of the longitudinal directions or one of the vertical directions is prohibited by the ribs 264, 266 and 268.

The casing 246 of the drive means 58 is secured to the lower base member 20. The casing 246 has a laterally extending flange 270 with a base portion 272 having apertures 274 therein. When the casing 246 of the drive means 58 is adjacent to and in contact with the ribs 264, 266 and 268, the apertures 274 are in alignment with the threaded apertures 276 in the lower base member 20. In order to provide a sufficient threaded depth in the threaded apertures 276, the lower base member 20 includes outwardly extending legs 278 as seen in FIGS. 2 and 6. The threaded fasteners 280 are then positioned through the apertures 274 and threadedly engage the threaded apertures 276 to secure the drive means 258 in its proper position adjacent to and in contact with the ribs 264, 266 and 268 of the lower base member 20.

As stated above, the transmission means 60 is provided to drivingly interconnect the drive means 58 and the chart pack assembly 26. The transmission means 60 includes a drive gear 284 drivingly connected to the drive shaft 282 of the timer motor 244 as seen in FIGS. 6 and 8. The transmission means 60 also includes a driven gear 286 drivingly connecting the feeding strip chart reel 30 in a manner as will be hereinafter described.

The gears 284 and 286 are in meshing engagement with each other when the chart pack assembly 26 and the drive means 58 are assembled in the lower base member 20. Upon rotation of the drive gear 284, the driven gear 286 will be driven to thereby rotate the driven strip chart reel 30 and advance the strip chart 14 in a manner as will be hereinafter described.

The speed at which the drive means 58 moves the strip chart 14 is predetermined. By making a notation on the strip chart 14 of the time that a particular portion of the strip chart is under the marker 24 of the sensor 22, the longitudinal distance along the strip chart may be measured to any desired point on the strip chart and the time the marker 24 passed that point determined.

The reels 28 and 30 are incorporated into the chart pack assembly 26 which provides a compact device for advancing the strip chart 14 upon operation of drive means 58. The strip chart may also be manually reviewed or advanced in a forward direction, as the case may be, depending on the operator of the data recording instrument 10. While embodying the above features, the chart pack assembly 26 is capable of maintaining security of the strip chart 14 after the strip chart recording is made so that the strip chart may not be tampered with, altered or replaced without permanent damage to the chart pack assembly.

The strip chart reels 28 and 30 are identical in construction prior to assembly. For ease of description of a detailed description of the feeding strip chart reel 28 will hereinafter be made with a description of the reels 28, 30 after assembly made thereafter.

The feeding strip chart reel 28, as seen in FIG. 6, has a flange portion 288 on one end thereof. The means 52 for manually advancing the strip chart 14 in either direction includes the flange portion 288 which has a roughened circular outer surface 290 which is positioned outside of the chart case 32 upon assembly to allow the reel 28 to be rotated manually in either direction. The flange portion 288 also has an inner surface 292 positionable adjacent to the outside of the chart case 32.

The reel 28 has a bearing portion 294 which is rotatably supported by the chart case 32 as will be hereinafter described. A strip chart guide flange 296 is provided interiorly of the chart case and adjacent to the bearing portion 294. The strip chart guide flange 296 has an outer surface 298 positionable adjacent to the inside of the chart case 32. The inner surface 292 of the flange portion 288 and the outer surface 298 of the guide flange 296 are positioned, when assembled with the chart case 32, to prohibit substantial lateral movement of the reel 28 in the chart case. The strip chart guide flange 296 has an inner strip chart edge guide surface 300 so that upon rotation of the feeding strip chart reel 28, the strip chart 14 is guided so that it may be uniformly unreeled from or reeled onto the feeding strip chart reel 28.

In order to provide radial support of the strip chart 14 as it is wound or unwound from the reel 28, a strip chart edge supporting portion 302, latterally extending portions 304 providing strip chart supporting surfaces 308, central chart support 310 and the strip chart edge supporting portion 312 is provided. The strip chart edge supporting portions 302 and 312 radially support the outer edges of the strip chart 14 while the central chart support portion 310 radially supports the central portion of the strip chart. The lateral strip chart supporting portions 308 extend between the strip chart edge supporting portions 302 and 312 and the central chart supporting portion 310 and support the strip chart 18 therealong.

The reel 28 also includes a strip chart guide flange 314 opposite the strip chart guide flange 296. The strip chart guide flange 314 has an inner strip chart edge guide surface 316 which is spaced from the inner strip guide surface 300 a distance substantially equal to the width of the strip chart 14. When the reel 28 is rotated, the strip chart 14 is guided so that it will be evenly wound and unwound on the reel 28. The strip chart guide flange 314 also has an outer surface which during assembly with the chart pack assembly 26 is adjacent to the inside of the chart case 32. The reel 28 has an extending shaft portion 320 extending from the strip chart guide flange 314.

Upon assembly, the outer end portion of the extending shaft 320 of the feeding strip chart reel 28 is deformed so that the outer end of the extending shaft has a head 322 formed thereon.

The extending shaft portion 320 of the driven strip chart reel 30 is drivingly connected to the driven gear 286 by means of a friction clutch 323 as shown in FIG. 7 and described hereinafter. The driven gear 286 has a gear portion 324 which is in meshing engagement with the drive gear 284 as described above and a hub portion 326. An aperature 328 extends through the rotational axis of the driven gear 286 and is of a size such that it may frictionally engage and be received by the extending shaft 320 of the reel 30. After the driven gear 286 is so assembled with the reel 30, the outer extremity of the extending shaft 320 is deformed, by any conventional means such as heat staking, into a headed portion 330. The frictional engagement between the driven gear 286 and the extending shaft portion 320 of the driven strip chart reel 30 is such that sufficient rotational force may be exerted on the reel 30 to manually advance the strip chart 14 and overcome the frictional engagement of the gear 286 and shaft portion 320. To manually rotate the reel 30, the flange portion 288 thereof is gripped around its circular outer surface 290 and manually rotated in either direction.

The chart case 32 includes upper and lower chart case members 34, 36 respectively for housing the reels 28, 30 and the strip chart 14. The lower strip chart case member 36 has cavities 42 and 44 for receiving the reels 28 and 30 respectively therein. The cavity 42 has a bottom portion 332 which is semi-circular in shape and slightly larger in diameter than the outer diameter of the strip chart guide flanges 296 and 314. The bottom 332 extends across the width of the lower chart case member 36 and terminates in end portions 340. Side portions 334, 336 extend upwardly from the bottom portion 332. The side portion 334 terminates in the upper edge 338 of the lower chart case member 36 while the other side portion 336 terminates in an interconnecting portion 348.

The end portions 340 have slots 342 therein of a size substantially equal to the diameter of the bearing portion 294 and extending shaft portion 340 of the feeding strip chart reel 28. The slots 342 have a semi-circular bottom portion 344 which acts as a partial bearng surface for the bearing portion 294 and extending shaft 320 of the reel 28. The slots 342 have side portions 346 extending upwardly to the upper edge 338.

The interconnecting portion 348 provides the strip chart supporting surface 40 which is substantially equal in width to the width of the strip chart 14. The interconnecting portion 348 has spacing lips 350 extending upwardly from the strip chart supporting surface 40. The spacing lips 350 terminate in the upper edge 338 of the lower chart case member 36.

The cavity 44 of the lower chart case member 36 which houses the driven strip chart reel 30 is of substantially the same construction as the cavity 42 and has a bottom 352 which is semi-circular in shape and substantially the same size as the bottom 332. Extending upwardly from the bottom 352 are side portions 354 and 356. The side portion 354 terminates in the interconnecting portion 348 while the side portion 356 terminates in the upper edge 338 of the lower chart case member 36.

The cavity 44 has end portions 360, one of which is substantially of the same construction and design as the end portion described in connection with the cavity 42. The other end portion 360 has a slot 364 which has a semi-circular bottom 368 which is of the same diameter as the outer diameter of the hub portion 326 of the driven gear 286. Extending upwardly from the semi-circular bottom portion 368 are side portions 370 each of which terminate in upper edge 338 of the lower chart case member 36.

The upper chart case member 34 has a lower surface 371 which, when assembled with the lower chart case member 36, is in contact with the upper edge 338 thereof. The upper chart case member 34 has bearing legs 372 extending downwardly from the lower surface 71 and toward the lower chart case member 36. The legs 372 have side portions 374 which are complimentary with and in contact with the side portions 346 of the lower chart case 36. The side portions 374 of the bearing legs 372 terminate in semi-circular concave bearing portions 376. When the upper and lower chart case members 34, 36 are assembled together, the bearing portions 344 and 376 are complimentary with each other. These bearing portions 344 and 376 provide a generally circular bearing surface on which the bearing portions 294 of the reels 28 and 30 and the extending shaft portion 320 of the feeding strip chart reel 28 is rotatably supported thereby.

As can be seen from the drawings and described hereinabove, the extending shaft 320 on the driven strip chart reel 30 is secured to the driven gear 286. The hub portion 326 of the driven gear 286 is rotatably supported by the upper and lower chart case members 34, 36. Accordingly, a driven gear 378 extends downwardly form the lower surface 371 of the upper chart member 34 and is receivable in the slot 364 in the lower base member 28. The side portions 380 of the driven gear leg 378 are complimentary with and received by the side portions 370 of the slot 364. The side portions 380 terminate in a semi-circular concave bearing portion 382 on the driven gear leg 378. Upon assembly of the chart pack assembly 26, the bearing portion 382 and the semi-circular bottom portion 368 co-act to provide a circular bearing surface which rotatably receives the hub portion 326 of the driven gear 286. Thus it can be seen from the above that the strip chart reels 28, 30 are rotatably received in the chart case 32.

To assemble the chart pack assembly 26, the one end 46 of the strip chart 14 is secured to and wound around the feeding strip chart reel 28. The one end 46 of the strip chart 14 is supported by the portions 302, 304, 308, 310 and 312 of the feeding strip chart reel 28. The feeding strip chart reel 28 is then inserted into the cavity 42 in the lower chart case member 36. The bearing portion 294 and extending shaft portion 320 of the feeding strip chart reel 28 are rotatably supported by the circular bottoms 344 of the slots 342 in the lower chart case member 36. Alternatively, the reel 28 can be eliminated and the end 46 of the strip chart 14 coiled directly into the cavity 42 if manual rewinding of the chart is not desired.

The central portion 48 of the strip chart 14 is positioned so that a portion thereof is supported by the strip chart support surface 40 of the inter-connecting portions 348 and between the spacing lip 350. The strip chart 14 is free to move longitudinally along the strip chart supporting surface 40 but is restricted from lateral movement by the spacing lips 350.

The other end 50 of the strip chart 14 is secured to the driven strip chart reel 30 by any conventional means such as applying a strip of tape to secure the strip chart 14 to the reel 30. As the reel 30 is rotated, the strip chart 14 will be "taken up" or wound therearound and supported by the portions 302, 304, 308, 310 and 312 of reel 30. It should be understood that the reel 30 is positioned in its respective cavity 44 and the bearing portion 294 and the outer surface of the hub portion 326 of the driven gear 286 is rotatably supported therein as described above. The upper chart case member 34 is then assembled with the lower chart case member 36.

Means 56 are provided for permanently securing the upper chart case member 34 to the lower chart case member 36. As seen in FIG. 4, the lugs 386 extend upwardly from the upper edge 338 of the lower chart case member 36. The upper chart case member 34 has openings 384 to receive the upwardly extending lugs 386 therein. When the lower surface 371 of the upper chart case member 34 is positioned adjacent to and in contact with the upper edge 338 of the lower chart case member 336, the openings 384 in the upper chart case member 34 receive the lugs 386 therein. The lugs 386 extend past the upper chart case member. The portion of the lugs 386 extending past the upper surface 388 are deformed and formed over the opening 384 so that the upper chart case member 34 may not be disassembled from the lower chart case member 36 without permanently damaging the upper or lower chart case member 34 or 36 respectively. It should be understood that other techniques may be provided for securing the chart case members 34, 36 together so as to provide visible indication of disassembly or tampering with the chart case members.

When the chart case members 34, 36 are so joined together, the strip chart 14 in the chart pack assembly 26 may not be tampered with, altered or replaced without permanently damaging the chart case 32. Thus, it would be readily indicated to an observer that the strip chart 14 in the chart pack assembly 26 was tampered with, altered or changed.

It is extremely important that the chart pack assembly 26 be securely mounted to the chart case 32 to avoid inadvertent marks to be made thereon by the sensor 22 and to assure meshing engagement of the gears 284 and 286. The chart pack assembly 26 is supported by cradle portion 390 of the lower base member 20 as shown in FIGS. 4, 6, 7 and 8. Each of the supporting cradle portions 390 are integrally molded to the bottom 74 and one of the sides 76, 78 of the lower chart member 36.

Each of the cradle portions 390 have slot shaped openings 392. The slot shaped openings 392 are formed to be complimentary with the outer portion of the lower case member 36 defining the cavities 42 and 44. Bosses 393 are provided and extend downwardly from the outer portion of the lower chart case member 36 in the area of the cavities 42, 44 as seen in FIGS. 6 and 7. The bosses 393 are located so that the chart pack assembly 26 is prohibited from longitudinal movement by contact of the bosses 393 with the supporting cradle portions 390. The slot-shaped openings 392 also prohibit lateral movement of the chart pack assembly 26. In order to assure alignment of the gears 284 and 286 and prohibit movement of the chart pack assembly 26 with respect to the drive means 58, the laterally extending flange 270 of the drive motor case 246 includes side portions 394 extending upwardly from the base portion 272 as seen in FIG. 4. The side portions 394 terminate in top portions 396. When the chart pack assembly 26 is properly positioned with respect to the lower base member 36, the upper surface of the upper chart case member 34 is in contact with the top lug-like portions 396 of the casing 246.

In order to assure alignment of the sensor 22 with respect to the chart pack assembly 26 so that the marking means 24 is capable of providing mark on the strip chart 14, the upper base member 16 has chart pack assembly retainer portions 398 as seen in FIG. 3. These retaining portions 398 have retaining surfaces 400 positioned so that when the upper and lower base member 18 and 20 respectively are assembled together in a closed position, the retaining surfaces 400 contact with the supporting cradle portions 390. If the chart pack assembly 26 is not properly positioned, the bosses 393 will contact the slot-shaped openings 392 of the supporting cradle portion 390 and will not allow the base 16 to completely close.

The upper base member 16 also includes a lateral drive means retaining portions 402 having laterally retaining surfaces 404. These retaining portions 402 assure that the drive means 58 is properly positioned with respect to the upper base member 16 and that all the components of the data recording instrument 10 are in alignment with each other. The lateral retaining surfaces of the retaining portion 402 contact the sides and rear of the drive means 58.

To begin proper operation of the data recording instrument 10, it may be necessary that certain notations be made on strip chart 14 prior to operation of the data recording instrument. A form is generally provided on the strip chart 14 for certain shipping information. In order to move the strip chart 14 so that this portion of the strip chart 14 may be viewed through the window 38, the strip chart 14 must be manually advanced forward by manually rotating the drive strip chart reel 30. The operator of the data recording instrument 10 may then make these notations on the strip chart 14 which will be supported by the strip chart supporting surface 40. After these notations are made, the strip chart 14 is advanced so that the indicator 406 is properly aligned to the chart at a beginning setting indicated on the strip chart.

To begin operation of the drive means 58, the nonconductive strip 262 is removed and the battery 248 provides power to the timer motor 244. The timer motor 244 begins rotation of the driven strip chart reel 30 through the transmission means 60. The upper and lower chart case members 34, 36 may then be closed and sealed as pointed out hereinabove.

Figure 9:
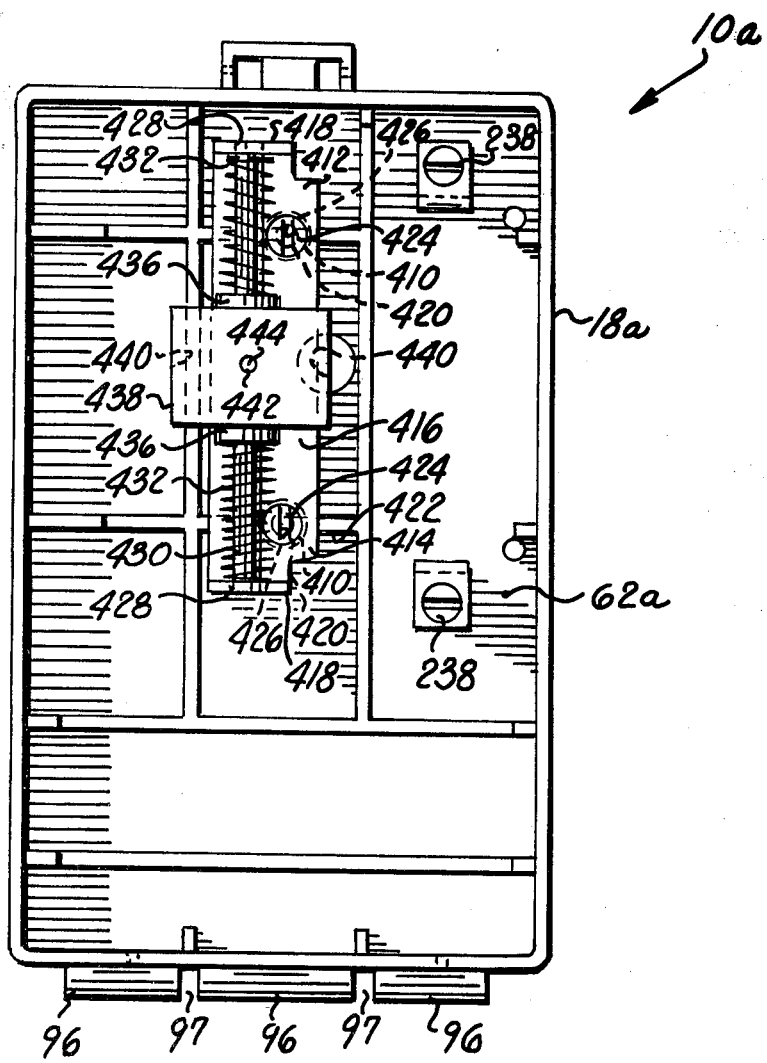
FIG. 9 is a top view of a portion of the data recording instrument shown in FIG. 1-8 showing a modification thereof.

To illustrate the versatility of the data recording instrument 10 of the present invention, a second embodiment of the data recording instrument is partially shown in FIGS. 9 and is generally indicated by the numeral 10a. It should be understood that the data recording instrument 10 and the data recording instrument 10a are similar in design and for ease of description, the parts that the data recording instrument 10a has in common to the data recording instrument 10 will be designated by the same numerals with the suffix a appended thereto.

The data recording instrument 10 is shown being capable of recording the environmental temperature which is important for some type of goods. Other types of goods require that excessive impact or shock forces will damage the goods. The impact or shock forces are customarily expressed in units of gravational force or G-units. For each particular type of goods there is an ascertainable or safe G-level of impact which the goods should be able to withstand without injury. Beyond this empirically determined G-level, there is a probability or likelihood that the magnitude of impact may have resulted in damage to the goods. Such damage is frequently not visible or immediately ascertainable particularly when the goods are delivered packaged and neither the shipper or the freight forwarder is aware of the occurence of any excessive impact.

The data recording instrument 10a is illustrated herein to provide a record of any impact forces exerted on the goods. The data recording instrument 10a has a lower base member with chart pack assembly, drive means and transmission means mounted therein identical to the data recording instrument 10 as described hereinabove.

The data recording instrument 10a has an upper base member 18a, as seen in FIG. 9, which is identical in construction to the upper base member 18. The upper base member 18a has a pair of bosses 140, extending inwardly of the top portion 62a.

The sensor 412 is provided to sense any impact forces exerted on the goods as described above. The impact sensor 412 includes a frame 414 with a base portion 416 and side portions 418 which extend upwardly from the base portion 416. The base portion 416 of the frame 414 has openings 420 therein which are located above and in alignment with the bosses 410 in the upper base member 18a.

In order to secure the impact sensor 412 to the upper base member 18a, lateral ribs 422 are provided on the upper base member 18a. The base portion 416 of the frame 414 is positioned on the lateral ribs 422 in which position the impact sensor 412 is properly located with respect to the chart pack assembly used in connection therewith. Accordingly, a mark may be made by the impact sensor 412 on the strip chart of the chart pack assembly to record any impact force sensed by the impact sensor 412.

The impact sensor 412 is secured to the lateral ribs 422 by the threaded fasteners 424 positioned through the openings 420 in the frame 414 and threadedly engaging the openings 426 in the bosses 410. The threaded fasteners 424 are tightened until the impact sensor 412 is secured thereto.

The impact sensor 412 also includes a rod 430 which extends between the side portions 418 and is positioned in and retained by the openings 428 in the side positions 418. A pair of springs 432 are positioned on the ends of the rod and have one end thereof in contact with the side portions 418. The other ends of the springs 432 are in contact with the cushion washers 436. A sliding block mass 438 is positioned between the cushion washers 436. The sliding block mass 438 is mounted to slide on the rod 430 when an impact force is exerted on the data recording instrument 10 sufficient to overcome the inertia of the sliding block mass.

To guide the sliding block mass 438 in its lateral movement along the rod 430, guide pins 440 are provided and extend downwardly from the sliding block mass 438 to a position adjacent to the base portion 416 of the frame 414. If the sliding block 438 should move along the rod 430, the guide pins 440 contact the base portion 416 of the frame 414 to prohibit rotational movement of the block 438.

The impact sensor 412 includes marking means, generally indicated at 442. The marking means 442 includes a marking pin 444 which is movable toward and away from the sliding block 438 and is biased away from the sliding block 438. The marking pin 444 has a pointed end thereon for making a mark on the strip chart. It should be understood that the impact sensor 412 is so positioned so that the marking pin 444 is properly positioned over the window in the chart pack assembly to properly record any impact exerted on the data recording instrument 10a in a direction along the direction of the rod 430.

I claim:

1. A recording instrument for accompanying a cargo, to record an environmental variable that can affect the cargo, comprising:

a housing;

a chart pack in said housing, said chart pack including a chart case containing a supply reel, a takeup reel, and a strip chart extending between the reels, and including a driven gear (286) connected to the takeup reel;

means lying in said housing responsive to a predetermined environmental variable for marking said chart; and a drive motor having a motor case (246) located in said housing and a drive gear (284), said motor case including a pair of lug-like top portions (396) on either side of the drive gear;

said chart pack positioned with an upper part (34) of the chart case immediately under the lug-like top portions (396) of the motor case and the driven gear (286) engaged with the drive gear (284), the housing having pack retainer portions (398) which old down the side of the chart pack adjacent the driven gear thereof, whereby the gears are accurately meshed and yet when the housing is opened the chart pack can be easily removed.

2. The instrument described in claim 1 wherein:

said drive motor comprises an electric motor connected to said drive gear to turn it, a battery compartment, and a switch for connecting a battery in said compartment to said electric motor;

said switch including a pair of terminals biased towards contact with one another, and a non-conductive strip lying between said terminals to keep theem separated, said strip having an end projecting out of said motor case to enable a person to pull said strip away from said position between said terminals.

* * * * *